Figure 1:
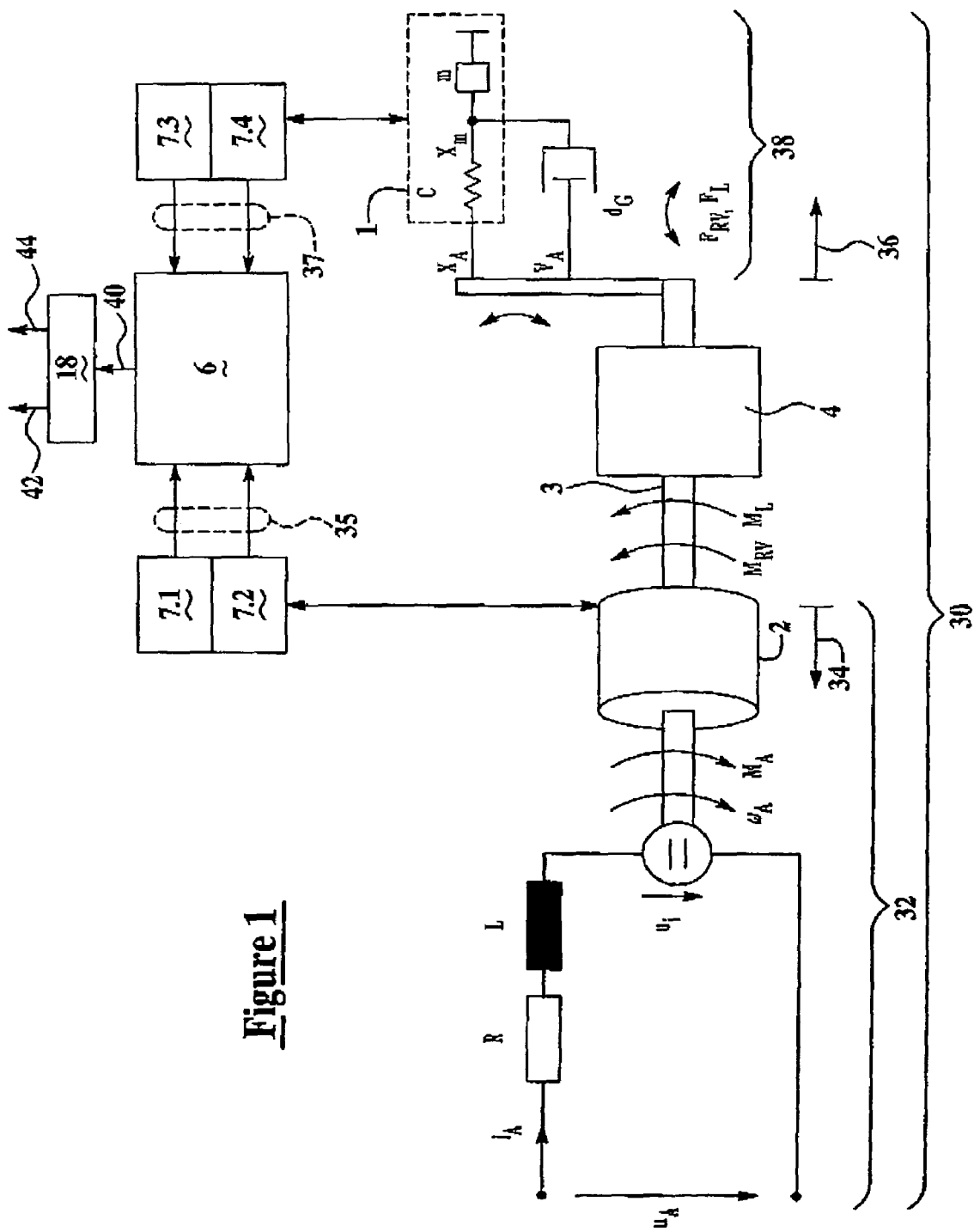

US007328123B2

(12) United States Patent
Hooge et al.

(10) Patent No.: US 7,328,123 B2
(45) Date of Patent: Feb. 5, 2008

(54) SYSTEM FOR COLLISION AVOIDANCE OF ROTARY ATOMIZER

(75) Inventors: Sven Hooge, Wendlingen (DE); Dietmar Wildermuth, Stuttgart (DE)

(73) Assignee: Durr Systems, Inc., Plymouth, MI (US)

( * ) Notice: Subject to any disclaimer, the term of this patent is extended or adjusted under 35 U.S.C. 154(b) by 35 days.

(21) Appl. No.: 11/350,434

(22) Filed: Feb. 9, 2006

(65) Prior Publication Data

US 2006/0129348 A1 Jun. 15, 2006

Related U.S. Application Data

(63) Continuation of application No. 10/895,430, filed on Sep. 24, 2003, now abandoned.

(30) Foreign Application Priority Data

Sep. 30, 2002 (DE) ................................ 102 45 594

(51) Int. Cl.
*G06F 15/00* (2006.01)

(52) U.S. Cl. ...................................................... 702/150

(58) Field of Classification Search ..................... None
See application file for complete search history.

(56) References Cited

U.S. PATENT DOCUMENTS

| | | | |
|---|---|---|---|
| 4,376,135 | A | 3/1983 | Patel et al. |
| 4,521,462 | A | 6/1985 | Smythe |
| 4,550,618 | A | 11/1985 | Kohama et al. |
| 4,572,437 | A | 2/1986 | Huber et al. |
| 4,589,597 | A | 5/1986 | Robisch et al. |
| 4,684,064 | A | 8/1987 | Kwok |
| 4,715,314 | A | 12/1987 | Ramseier et al. |
| 4,852,810 | A | 8/1989 | Behr et al. |
| 4,919,333 | A | 4/1990 | Weinstein |
| 4,927,081 | A | 5/1990 | Kwok et al. |
| 4,944,459 | A | 7/1990 | Watanabe et al. |

(Continued)

FOREIGN PATENT DOCUMENTS

| | | |
|---|---|---|
| DE | 41 05 116 A1 | 8/1992 |

(Continued)

OTHER PUBLICATIONS

Roy Featherstone: "Robot dynamics Algorithms," Chapter 4 (Kluwer Academic Publishers, 1987).

*Primary Examiner*—John Barlow
*Assistant Examiner*—Joanthan Moffat
(74) *Attorney, Agent, or Firm*—Howard & Howard Attorneys, P.C.

(57) ABSTRACT

A monitoring method for a drive system with a motor and a moving part driven by the motor. The movement of the driven part is monitored and the movement of the driving part is monitored and compared to recognize a collision between the driven part and another structure. Measurement of at least one drive-side motion quantity of the motor is taken and measurement of at least one driven-side motion quantity of the moving part is taken. The motion quantity can be a position, velocity or acceleration. A dynamic model is calculated based on predetermined or expected operational data and the drive side measured data. An error signal is generated when the motion quantity measured on the driven side varies from the dynamic model.

11 Claims, 2 Drawing Sheets

U.S. PATENT DOCUMENTS

| | | | |
|---|---|---|---|
| 4,955,960 | A | 9/1990 | Behr et al. |
| 5,011,086 | A | 4/1991 | Sonnleitner et al. |
| 5,078,321 | A | 1/1992 | Davis et al. |
| 5,127,125 | A | 7/1992 | Skibowski |
| 5,294,217 | A | 3/1994 | Talacko et al. |
| 5,297,044 | A | 3/1994 | Sakaki et al. |
| 5,300,006 | A | 4/1994 | Tanaka et al. |
| 5,397,063 | A | 3/1995 | Weinstein |
| 5,622,563 | A | 4/1997 | Howe et al. |
| 5,633,306 | A | 5/1997 | Howe et al. |
| 5,662,278 | A | 9/1997 | Howe et al. |
| 5,683,032 | A | 11/1997 | Braslaw et al. |
| 5,704,977 | A | 1/1998 | Baumann et al. |
| 5,754,970 | A | 5/1998 | Takasaki et al. |
| 5,827,148 | A * | 10/1998 | Seto et al. ............ 477/15 |
| 5,865,380 | A | 2/1999 | Kazama et al. |
| 6,037,010 | A | 3/2000 | Kahmann et al. |
| 6,090,450 | A | 7/2000 | Kahmann et al. |
| 6,175,793 | B1 * | 1/2001 | Ironside ............ 701/41 |
| 6,480,771 | B2 | 11/2002 | Nishida et al. |
| 6,508,610 | B2 | 1/2003 | Dietrich |
| 6,589,348 | B2 | 7/2003 | Ott |
| 6,678,583 | B2 * | 1/2004 | Nasr et al. ............ 700/245 |
| 2002/0116145 | A1 | 8/2002 | Kawasaki et al. |

FOREIGN PATENT DOCUMENTS

| | | |
|---|---|---|
| DE | 43 42 128 A1 | 6/1995 |
| DE | 196 10 588 A1 | 9/1997 |
| DE | 197 09 988 A1 | 10/1998 |
| DE | 197 42 588 A1 | 4/1999 |
| DE | 198 30 029 A1 | 1/2000 |
| DE | 199 09 369 A1 | 9/2000 |
| DE | 199 37 425 A1 | 3/2001 |
| DE | 100 33 986 A1 | 1/2002 |
| DE | 100 63 234 C1 | 7/2002 |
| DE | 101 30 173 A1 | 1/2003 |
| DE | 10 45 594 A1 | 4/2004 |
| EP | 0 283 918 B1 | 3/1988 |
| EP | 0 171 042 B1 | 7/1988 |
| EP | 0 238 031 B1 | 10/1990 |
| EP | 0 801 991 A3 | 8/1998 |
| EP | 0 904 848 A1 | 3/1999 |
| EP | 0 967 016 A1 | 12/1999 |
| EP | 1 108 475 A2 | 6/2001 |
| EP | 1 114 677 A1 | 7/2001 |
| EP | 1 118 388 A1 | 7/2001 |
| EP | 0 796 663 B1 | 8/2001 |
| EP | 1 172 152 A1 | 1/2002 |
| WO | WO 94/22589 | 10/1994 |
| WO | 0 767 005 A1 | 4/1997 |
| WO | WO 98/51453 | 11/1998 |

\* cited by examiner

SYSTEM FOR COLLISION AVOIDANCE OF ROTARY ATOMIZER

This application is a continuation of U.S. application Ser. No. 10/895,430, filed Sep. 24, 2003 now abandoned.

BACKGROUND OF THE INVENTION

1. The Field of the Invention

The invention concerns a monitoring method for a drive system with a motor and a moving part driven by a motor and more specifically to a system for detecting collisions between a moveable robot and other structure.

2. Related Prior Art

Painting systems for painting vehicle chassis include multi-axis painting robots. The robots include drive systems to control the position of a rotary atomizer. The drive systems include sensors and a controller that emits control signals to motors associated with the robot. The control signals are sent in response to signals received by sensors in accordance with a control program stored in the memory of the controller. The control program is prepared to achieve optimum painting results.

Painting robots can be positioned adjacent other structures. A collision between the painting robot and room boundaries, obstacles, or persons is possible. The collision should be recognized as soon as possible in order to prevent damage to the painting robot, or injury to the persons, or less than desirable painting results. WO98/51453 discloses a monitoring method for a robot that includes collision recognition. In WO98/51453, the reaction of the mechanism to the drive of the robot is evaluated and an error signal is generated as a function of this reaction. For example, if the painting robot bumps against a stationary obstacle like a building wall, then a disturbance force acts on the robot. This force is fed back to the drive so that the drive is halted. For a collision with an elastic obstacle, a disturbance force likewise acts on the robot. Here, however, the force merely leads to slow or inhibit robot motion. However, in each case, the motion quantities of the drive, such as the angular position and the rpm of the motor shaft, deviate at least for a short time from the disturbance-free values.

Thus, known monitoring methods measure the drive-side motion quantities, such as the angular position and rpm of the motor shaft. The error signal generated as a response to collision recognition is calculated from the motion quantities measured on the drive side and the preset regulation or control quantities for controlling the drive and the mechanism.

However, a disadvantage of this known monitoring method for collision recognition is that the mechanical reaction of a collision disturbance force on the drive is strongly reduced by interposed gears. For example, for painting robots, gears with a transmission ratio of 1:100 are used between the drive and the mechanism so that the mechanical reaction of a collision on the drive can be measured only with difficulty. Another disadvantage of known monitoring methods is that incorrect models for the drive lead to large errors, because the reaction of the mechanism to the drive is then set incorrectly. Finally, another disadvantage of known monitoring methods is that the angular position is measured on the drive side, while the acceleration is calculated by differentiating the measured value twice. This second derivative of the measured value leads to a very noisy signal.

Thus, the invention is based on the problem of improving the previously described, known monitoring method for collision recognition so that collision recognition is possible with higher reliability and a quicker reaction time even with interposed gears, for as little measurement expense as possible.

SUMMARY OF THE INVENTION

According to the invention, an error signal that enables collision recognition is calculated from the motion quantities of the driven mechanism measured on the driven side and from the motion quantities measured on the drive side.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 a physical equivalent circuit diagram of an electromotor with a gear and a pivoting mechanism;

FIG. 2 a regulation-specific equivalent circuit diagram of an electromotor and a pivoting mechanism of a robot; and FIG. 3 a monitoring device according to the invention.

DETAILED DESCRIPTION OF THE PREFERRED EMBODIMENT

Referring to FIG. 1 and for determining a system error signal, the invention includes the general technical teaching of not only measuring drive-side (as indicated generally by arrow 34) motion quantities 35 of the drive system 30 preferably having a direct current motor 32, but also motion quantities 37 on the driven side (as indicated by arrow 36), i.e., on a driven mechanism 38.

One advantage of measuring motion quantities 35, 37 on the driven side 36 and the drive side 34 is the fact that the determination of the error signal corresponding to a collision is more accurate. For example, gears 4 interposed between the driven side 36 and the drive side 34 can prevent the communication of collision forces to sensors 7.1, 7.2 disposed on the drive side 34. Thus, the monitoring method for collision recognition according to the present invention can also be used for drive systems 30 which have gears 4 with a high transmission factor.

Another advantage of the monitoring method according to the invention is the fact that feedback of control or regulation quantities is not required, so that the monitoring method according to the invention is independent of the type and structure of the drive regulation or control.

In a preferred embodiment of the invention, a comparison value for the drive force and the drive moment of the motor 32 is calculated from the motion quantities 37 measured on the driven side 36 and from the motion quantities 35 measured on the drive side, 32, where preferably a dynamic model of the motor 32 and the mechanism 38 of the drive system 30, respectively, is taken into account. The dynamic model contemplates the inertia of various components of the system 30, the elastic components, and also the frictional forces or moments of the drive system 30. For disturbance-free operation of the drive system 30, the two comparison values calculated and processed by a monitoring device 6 must agree, while a deviation between the two comparison values can indicate a disturbance or even a collision as then processed by an evaluation unit 18.

The calculation of comparison values for the drive force or the drive moment can be implemented on the drive side 34 and/or on the driven side 36 by a recursive computational method, such as that described, e.g., in Roy Featherstone: "Robot Dynamics Algorithms," Chapter 4, pages 65-79 (Kluwer Academic Publishers, 1987), ISBN # 0898382300.

The motion quantities measured 35 on the drive side 34 preferably include at least one of a position, a velocity, and/or an acceleration of a drive shaft or armature 2 of the DC motor 32. It is sufficient to measure only one of these motion quantities, while the other two motion quantities can be determined through time differentiation or integration of the measured motion quantity. For example, it is possible to measure only the rotational velocity of the motor drive shaft 2, wherein the acceleration of the motor drive shaft 2 is obtained through differentiation of the measured rotational velocity, and the angular position of the motor drive shaft 2 can be calculated through integration of the measured rotational velocity.

The acceleration of the motor 32 can be measured as a drive-side motion quantity 35. Such a direct measurement of acceleration provides higher accuracy compared with differentiating the measured velocity or even the measured position. For example, differentiating the measured angular position of the motor drive shaft 2 twice leads to a very noisy signal.

In contrast, one of the position, the velocity, and/or the acceleration of the driven mechanism 38 can be measured as the driven-side motion quantities 37. Here, fundamentally, it is also sufficient to measure only one of these motion quantities 37, while the other two motion quantities can be obtained through time differentiation or integration of the measured motion quantity. For example, it is possible to measure only the velocity of the mechanism 38, wherein the acceleration of the mechanism 38 is obtained through differentiation of the measured velocity and the position of the mechanism 38 can be calculated through integration of the measured velocity.

However, preferably the acceleration of the driven mechanism 38 is measured as a driven-side motion quantity 37. Such a direct measurement of the acceleration provides higher accuracy compared with an acceleration value derived from differentiating the measured velocity or even the measured position. For example, differentiating the measured position of the mechanism 38 twice leads to a very noisy signal.

For a multi-axis drive system 30, the error signal output 40 of the monitoring device 6 can preferably be determined separately for the individual axes of the drive system. As will be described and illustrated in FIG. 3, the error signals for the individual axes can each form components of an error vector. For the evaluation and determination of the error signal, a scalar error value is then preferably calculated by the evaluation unit 18 in order to also be able to recognize collisions, which effect only certain axes of the drive system 30.

In addition, the two comparison values for the drive force or the drive moment are also determined separately for each axis. However, due to the interaction between the individual axes, the motion quantities measured for the other axes are also taken into account for the calculation of the comparison values in the individual axis.

For suppressing temporary measurement errors, a sliding mean value of the error signal is preferably formed by the evaluation unit 18. The mean value determined in this way is then preferably compared with a predetermined threshold. If the threshold is exceeded, it is then assumed that a collision has occurred, which may initiate an emergency off action 42.

In addition, the monitoring method according to the invention can also recognize creeping disruptions of the drive system 30, such as, when the friction of the drive system increases due to bearing damage. For this purpose, preferably a sliding mean value of the error signal is formed over a long time period. The mean value formed in this way is then compared with a predetermined threshold. If the threshold is exceeded, it is then assumed that bearing damage has occurred, which can be indicated by a warning message 44.

The physical equivalent circuit diagram in FIG. 1 shows a conventional electromechanical drive system for driving a shaft 1 of a painting robot, with additional drive systems being provided for driving the other shafts of the painting robot, which are configured similarly and thus are not described for simplification.

The shaft 1 of the painting robot is simulated in the physical equivalent circuit diagram by a mass m and a spring element c, while the damping of the shaft 1 is ignored for this embodiment.

The drive of the shaft 1 is here realized by the externally excited direct-current motor 32, which is represented in the physical equivalent circuit diagram as a series circuit composed of the Ohmic resistor R of the armature, the inductance L of the armature, and the voltage $u_i$ induced by the armature 2 in the armature circuit (or rotor if AC motor). In complex notation, the armature voltage $u_A$ is:

$$u_A = R \cdot i_A + s \cdot L \cdot i_A + u_i \qquad (1)$$

The direct-current motor 32 is connected to shaft 1 via a drive shaft 3 and a gear 4, with the gear 4 converting the rotational motion of the drive shaft 3 into a different rotational motion.

The voltage $u_i$ induced in the armature circuit then results from the motor constant $K_M$ and the angular velocity $\omega_A$ of the drive shaft 3 according to the following equation:

$$u_i = K_M \cdot \omega_A \qquad (2)$$

Furthermore, the drive moment $M_A$ of the direct-current motor 32 is the product of the armature current $i_A$ and the motor constant $K_M$:

$$M_A = K_M \cdot i_A \qquad (3)$$

On the other side, a frictional force $F_{RV}$ acts on the shaft 1. This force is converted by the gear 4 into a frictional moment $M_{RV}$:

$$M_{RV} = \frac{F_{RV}}{i_G} = \frac{v_A \cdot d_G}{i_G} = \omega_A \cdot d_G \qquad (4)$$

In addition, a load $F_L$ also acts on the shaft 1. This load is converted by the gear 4 into a load moment:

$$M_L = \frac{F_L}{i_G} = \frac{c \cdot (x_A - x_m) + d_G \cdot (v_A - v_m)}{i_G}$$

The drive shaft 3 is thus accelerated by the drive moment $M_A$ and braked by the frictional moment $M_{RV}$ and also by the load moment $M_L$. Taking into account the inertial moment $J_A$ of the drive, the following acceleration $d\omega_A/dt$ of the drive shaft 3 then results:

$$\frac{d\omega}{dt} = \frac{M_A - M_L - M_{RV}}{J_A} \quad (5)$$

Figure 2:
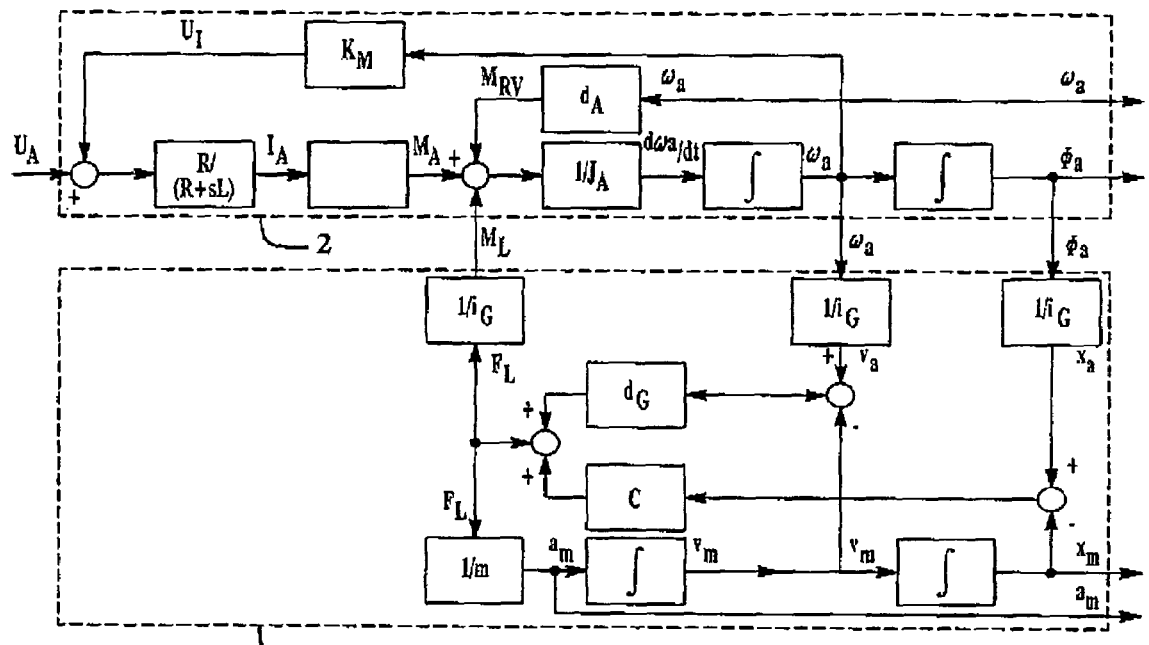

In contrast, the block circuit diagram in FIG. 2 shows a regulation-specific equivalent circuit diagram of the armature 2 of the direct-current motor 32 and a mechanism 5, with the mechanism 5 also including a shaft and gear similar to shaft 1 and gear 4.

The calculation of the individual electrical and mechanical quantities is realized corresponding to the previously listed equations, as can be seen directly from FIG. 2.

However, the previously listed equations apply only to the case of undisturbed movement of the shaft 1. In contrast, if the motion of the shaft 1 is disturbed, then additional forces that lead to deviations of the actual system behavior from the ideal model behavior act on the shaft 1, in addition to the frictional force $F_{RV}$ and the load $F_L$.

For example, if a painting robot bumps against the wall of a painting cabin, then the motion of the painting robot is strongly braked. Also, if there is bearing damage, the painting robot does not follow the modeled behavior exactly because the friction due to the bearing damage is strongly increased and is not taken into account in the previously listed equations. In such cases, the error should be recognized as quickly as possible in order to be able to introduce countermeasures.

Figure 3:
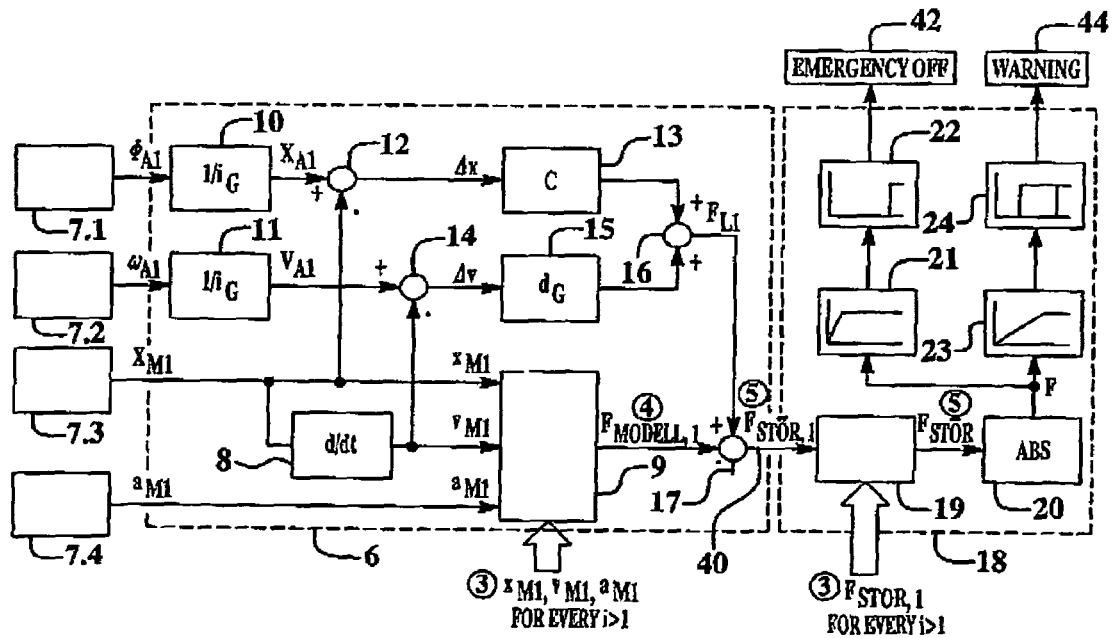

Referring to FIG. 3, the monitoring device 6 is provided for each shaft of the painting robot. These monitoring devices recognize deviation of the actual behavior of the drive system 30 from the modeled behavior. Here, for simplification, only the monitoring device 6 for the first shaft is shown, but the monitoring devices for the other shafts are configured identically.

The monitoring device 6 is connected on the input side to several sensors 7.1-7.4, with the sensors 7.1 and 7.2 measuring the angular position $\phi_{A1}$ and the angular velocity $\omega_{A1}$ of the drive shaft 3, respectively, while the sensors 7.3 and 7.4 detect the position $x_m$ of the shaft 1 and the acceleration $a_m$ of the shaft 1, respectively.

Alternatively, it is also possible to provide only one sensor for measuring one drive-side motion quantity 35 and one sensor for measuring one driven-side motion quantity 37, where additional motion quantities can be determined from the measured values. This can be implemented, e.g., through time differentiation or integration of the measured values or through the use of a so-called observer.

The position $x_{m1}$ of the shaft 1 is then supplied to a differentiator 8, which calculates the velocity $v_{m1}$ of the shaft 1 as a time derivative of the position $x_{m1}$, so that a measurement of the velocity $v_{m1}$ in this embodiment is not required.

The position $x_{m1}$, the velocity $v_{m1}$, and the acceleration $a_{m1}$ of the shaft 1 are then supplied to a computational unit 9, which calculates a model-based value $F_{MODELL,1}$ for the force acting on the shaft 1 based on a predetermined model and also taking into account the corresponding motion quantities $x_{mi}$, $v_{mi}$, and $a_{mi}$ of the other shafts. Thus, the calculation of the model-based value $F_{MODELL,1}$ is here implemented using load-side or driven side measurement data.

In addition, the monitoring device 6 calculates from drive-side measurement data a comparison value $F_{L1}$ for the force acting on the shaft 1 from the drive-side. For this purpose, the monitoring device 6 has two computational units 10, 11, which convert the measured angular position $\phi_{A1}$ and the measured angular velocity $\omega_{A1}$ of the drive shaft 3 into corresponding values $X_{A1}$ and $Y_{A1}$ while taking into account the gear transmission ratio $i_G$.

The drive-side calculated position path $X_{A1}$ is then supplied to a subtractor 12, which calculates the difference $\Delta x = X_{A1} - X_{m1}$ between the drive-side calculated position path $x_{A1}$ and the actually measured position $x_{m1}$ of the mass m of the shaft 1. This difference $\Delta x$ is supplied to another computational unit 13, which calculates the elastic percentage $\Delta x \cdot c$ of the force acting on the shaft 1 while taking into account the spring constant c.

In contrast, the drive-side calculated velocity $v_{A1}$ is supplied to a subtractor 14, which calculates the difference $\Delta v = v_{A1} - v_{m1}$ between the drive-side calculated position velocity $v_{A1}$ and the actually measured velocity of the mass m of the shaft 1. This difference $\Delta v$ is then supplied to a computational unit 15, which calculates the percentage of force acting on the shaft 1 due to the gear damping as a product of the damping constant $d_G$ and the velocity difference $\Delta v$.

On the output side, the two computational units 13, 15 are connected to an adder 16, which calculates the comparison value $F_{L1}$ for the force acting on the shaft 1 from the elastic percentage $c \cdot \Delta x$ and the damping percentage $d_G \cdot \Delta v$.

Furthermore, the monitoring device 6 has a subtractor 17, which is connected on the input side to the adder 16 and the computational unit 9, and calculates the difference between the two comparison values $F_{L1}$ and $F_{MODELL,1}$, and outputs an error signal $F_{STÖR,1}$ (as indicated by element number 40).

For undisturbed motion of the shaft 1, the two comparison values $F_{L1}$ and $F_{MODELL,1}$ agree up to an unavoidable measurement error, because the modeling of the dynamic behavior of the shaft 1 reproduces its actual behavior. The calculation of the force $F_{L1}$ acting on the shaft 1 from the motion quantities measured on the drive side, $\omega_{A1}$ and $\phi_{A1}$ then produces the same value as the calculation of the force $F_{MODELL,1}$ acting on the shaft 1 from the motion quantities $x_{M1}$ and $a_{M1}$ measured on the load side.

In contrast, if the motion of the shaft 1 is disturbed, then the comparison values $F_{L1}$ and $F_{MODELL,1}$ deviate from each other, with the deviation of these quantities reproducing the severity of the disturbance. Thus, increased bearing friction leads only to a relatively small error signal $F_{STÖR,1}$, while the collision of the shaft 1 with a boundary leads to a very large error signal $F_{STÖR,1}$.

Furthermore, for evaluating the operating behavior for all of the shafts, there is an evaluation unit 18, which is connected on the input side to the individual monitoring devices 6 for the individual shafts and receives the error signals $F_{STÖR,i}$ for all of the shafts.

The evaluation unit 18 contains a support element 19, which receives the error signals $F_{STÖR,i}$ for all of the shafts in parallel and outputs them as a multi-dimensional disturbance force vector $F_{STÖR}$ to a computational unit 20.

The computational unit 20 then calculates a scalar error value F from the individual components of the disturbance force vector $F_{STÖR}$, said scalar error value F reproduces the severity of the disturbance acting on the painting robot.

The error value F of the disturbance force vector $F_{STÖR}$ is then supplied to a computational unit 21, which calculates the sliding mean value of the error signal F in order to suppress the influence of measurement outliers in the evaluation. The averaging period of the computational unit 21 is relatively short, so that suddenly occurring disturbances, such as a collision of the painting robot with an obstacle, are recognized quickly.

On the output side, the computational unit 21 is connected to a threshold element 22. The emergency-off signal 42 is generated when a predetermined threshold is exceeded, which leads to immediate halting of the painting robot in order to prevent damage to the painting robot and to the surroundings or even injuries to persons in the area.

In addition, the evaluation unit 18 has another branch in order to be able to react to more slowly occurring and smaller disturbances. For this purpose, the computational unit 20 is connected to a computational unit 23, which calculates the sliding mean value of the error signal F, where the computational unit 23 has a greater averaging period than the computational unit 21, so that only changes that take place over a longer time period are taken into account.

On the output side, the computational unit 23 is connected to a threshold element 24, which generates the warning signal 44 when a predetermined threshold is exceeded.

The invention is not limited to the previously described embodiment. Indeed, a plurality of variants and modifications are possible, which likewise make use of the concept of the invention and thus fall within the scope of protection.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. Monitoring method for a drive system of a robot, more specifically a painting robot, with a motor and a moving part driven by the motor, with the following steps:
   measurement of at least one drive-side motion quantity ($\phi_{A1}$, $\omega_{A1}$) of the electric motor,
   measurement of at least one driven-side motion quantity ($x_{M1}$, $a_{M1}$) of the moving part,
   determination of an error signal ($F_{STÖR}$) as a function of the motion quantities ($\phi_{A1}$, $\omega_{A1}$) of the electric motor measured on the drive side and of the motion quantities ($x_{M1}$, $a_{M1}$) of the moving part measured on the driven side;
   measuring an armature current in an armature circuit of the electric motor;
   measuring a voltage induced n the armature; and
   calculating a comparison value ($F_{MODELL,1}$) from the armature current, the induced voltage and the at least one driven-side motion quantity ($x_{M1}$, $a_{M1}$).

2. The monitoring method set forth in claim 1 comprising the further steps of:
   calculation of a first comparison value ($F_{L1}$) for a drive force or a drive moment of the motor with reference to the motion quantities ($\phi_{A1}$, $\omega_{A1}$) of the motor measured on the drive side;
   comparison of the first comparison value ($F_{L1}$) with the second comparison value ($F_{MODELL,1}$); and
   generation of the error signal ($F_{STÖR}$) as a function of the comparison.

3. A drive system of a robot comprising:
   a rotating first shaft;
   a rotating second shaft engaged and disposed non-concentrically to the first shaft;
   a first sensor constructed and arranged on the first shaft for measuring a first position value;
   a second sensor constructed and arranged on the first shaft for measuring a first angular velocity value;
   a third sensor constructed and arranged on the second shaft for measuring a second position value;
   a fourth sensor constructed and arranged on the second shaft for measuring an acceleration value; and
   a monitoring device that receives input from the first, second, third and fourth sensors and outputs an error signal;
   a differentiator of the monitoring device for calculating a second angular velocity value of the second shaft as a time derivative of the second position value.

4. The drive system set forth in claim 3 further comprising a comparison force value calculated by the monitoring device from at least the first angular velocity value, the first position value, the second position value, and the second angular velocity.

5. The drive system set forth in claim 3 further comprising a first computational unit of the monitoring device for calculating a model-based force value from the second position value, the second acceleration value and the second angular velocity.

6. The drive system set forth in claim 5 further comprising a subtractor of the monitoring device for calculating the outputted error signal from the comparison force value and the model-based force value.

7. The drive system set forth in claim 6 further comprising an evaluation unit that receives the error signal from the monitoring device, the evaluation unit having an emergency stop output signal.

8. The drive system set forth in claim 7 further comprising:
   a second computational unit of the evaluation unit for calculating a sliding mean value over time and associated with an output warning signal; and
   a third computational unit of the evaluation unit for calculating the emergency stop output signal; and
   wherein the third computational unit has a shorter averaging period than the second computational unit.

9. A drive system of a robot comprising:
   an electric motor having a rotating first shaft having an angular first velocity;
   a rotating second shaft having an angular second velocity that is different than the first velocity;
   a gear connected between the first and second shafts;
   the first shaft having at least one drive sensor for measurement of at least one drive-side motion quantity ($\phi_{A1}$, $\omega_{A1}$) of the first shaft;
   the second shaft having at least one driven sensor for measurement of at least one driven-side motion quantity ($x_{M1}$, $a_{M1}$) of the second shaft;
   a monitoring device that receives input signals from the at least one drive sensor and the at least one driven sensor; and
   an error signal ($F_{STÖR}$) calculated and outputted by the monitoring device
   an evaluation unit for receipt of the error signal from the monitoring device the evaluation unit having a first computation unit for calculating a sliding mean value over time and associated with an output warning signal and a second computational unit of the evaluation unit for calculating an emergency stop output signal.

10. The drive system set forth in claim 9 wherein the second computational unit has a shorter averaging period than the first computational unit.

11. The drive system set forth in claim 9 wherein the first shaft is an armature.

* * * * *

UNITED STATES PATENT AND TRADEMARK OFFICE
CERTIFICATE OF CORRECTION

PATENT NO. : 7,328,123 B2  Page 1 of 1
APPLICATION NO. : 11/350434
DATED : February 5, 2008
INVENTOR(S) : Sven Hooge and Dietmar Wildermuth It is certified that error appears in the above-identified patent and that said Letters Patent is hereby corrected as shown below:

Column 7, line 30, claim 1, please delete "a" and replace with --an electric--.

Column 7, line 43, claim 1, please delete "n" and replace with --in--.

Column 8, line 14, claim 5, please delete "3" and replace with --4--.

Column 8, line 55, claim 9, please delete --,-- between "device" and "the."

Signed and Sealed this

Third Day of June, 2008

JON W. DUDAS
*Director of the United States Patent and Trademark Office*